(12) United States Patent
Beckhardt et al.

(10) Patent No.: US 10,271,078 B2
(45) Date of Patent: *Apr. 23, 2019

(54) CONFIGURATION OF PLAYBACK DEVICE AUDIO SETTINGS

(71) Applicant: Sonos, Inc., Santa Barbara, CA (US)

(72) Inventors: Steven Beckhardt, Santa Barbara, CA (US); Andrew Schulert, Cambridge, MA (US); Ron Kuper, Arlington, MA (US); Jonathan Lang, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/958,598

(22) Filed: Dec. 3, 2015

(65) Prior Publication Data

US 2016/0100206 A1 Apr. 7, 2016

Related U.S. Application Data

(63) Continuation of application No. 13/767,850, filed on Feb. 14, 2013, now Pat. No. 9,237,384.

(51) Int. Cl.
*H04N 21/254* (2011.01)
*H04N 21/65* (2011.01)
(Continued)

(52) U.S. Cl.
CPC ......... *H04N 21/2541* (2013.01); *G06F 3/165* (2013.01); *H04N 21/218* (2013.01);
(Continued)

(58) Field of Classification Search
CPC ........... H04N 21/2541; H04N 21/4627; H04N 21/218; H04N 21/4432; H04N 21/43615; H04N 21/65; G06F 3/165
(Continued)

(56) References Cited

U.S. PATENT DOCUMENTS 5,440,644 A 8/1995 Farinelli et al.
5,598,278 A 1/1997 Tanaka et al.
(Continued)

FOREIGN PATENT DOCUMENTS

CN 1825802 A 8/2006
CN 101335586 A 12/2008
(Continued)

OTHER PUBLICATIONS

Japanese Intellectual Property Office, Office Action Summary dated Sep. 13, 2016, issued in connection with Japanese Patent Application No. 2015-558166, 9 pages.
(Continued)

*Primary Examiner* — Brian J. Gillis
*Assistant Examiner* — Jsing Forng Lin
(74) *Attorney, Agent, or Firm* — McDonnell Boehnen Hulbert & Berghoff LLP

(57) ABSTRACT

Example techniques describe may facilitate a playback device joining a playback network. An example implementation involves a computing device, such as smartphone or tablet, receiving, from a playback device, a message indicating that the playback device is available to join a playback network. The computing device determines, based on a configuration table, an audio setting corresponding to the playback device and transmits, to the playback device, a message indicating (i) security parameters to be used by the playback device to join the playback network, (ii) the identified audio setting to be applied by the playback device upon joining the playback network.

21 Claims, 12 Drawing Sheets

(51) Int. Cl.
   *H04N 21/436* (2011.01)
   *H04N 21/443* (2011.01)
   *G06F 3/16* (2006.01)
   *H04N 21/218* (2011.01)
   *H04N 21/4627* (2011.01)

(52) U.S. Cl.
   CPC ... *H04N 21/43615* (2013.01); *H04N 21/4432* (2013.01); *H04N 21/4627* (2013.01); *H04N 21/65* (2013.01)

(58) Field of Classification Search
   USPC ........................................................... 709/220
   See application file for complete search history.

(56) References Cited

U.S. PATENT DOCUMENTS

| | | | |
|---|---|---|---|
| 5,761,320 A | 6/1998 | Farinelli et al. | |
| 5,923,902 A | 7/1999 | Inagaki | |
| 6,032,202 A | 2/2000 | Lea et al. | |
| 6,256,554 B1 | 7/2001 | DiLorenzo | |
| 6,349,352 B1 | 2/2002 | Lea | |
| 6,404,811 B1 | 6/2002 | Cvetko et al. | |
| 6,469,633 B1 | 10/2002 | Wachter | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,251,533 B2 | 7/2007 | Yoon et al. | |
| 7,263,070 B1 | 8/2007 | Delker et al. | |
| 7,295,548 B2 | 11/2007 | Blank et al. | |
| 7,383,036 B2 | 6/2008 | Kang et al. | |
| 7,394,480 B2 | 7/2008 | Song | |
| 7,433,324 B2 | 10/2008 | Switzer et al. | |
| 7,469,139 B2 | 12/2008 | Van | |
| 7,483,538 B2 | 1/2009 | McCarty et al. | |
| 7,571,014 B1* | 8/2009 | Lambourne | H04R 27/00 700/94 |
| 7,607,091 B2 | 10/2009 | Song et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington et al. | |
| 8,249,071 B2 | 8/2012 | Kreifeldt et al. | |
| 8,280,076 B2 | 10/2012 | Devantier et al. | |
| 8,326,951 B1 | 12/2012 | Millington et al. | |
| 8,483,853 B1 | 7/2013 | Lambourne | |
| 8,527,876 B2 | 9/2013 | Wood et al. | |
| 8,831,761 B2 | 9/2014 | Kemp et al. | |
| 8,886,774 B2 | 11/2014 | Sokabe et al. | |
| 8,989,406 B2 | 3/2015 | Wong et al. | |
| 9,326,069 B2* | 4/2016 | Mayman | G06F 1/1632 |
| 9,703,471 B2* | 7/2017 | Wachter | G06F 3/0488 |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0131065 A1* | 7/2003 | Neufeld | H04L 69/329 709/208 |
| 2003/0157951 A1 | 8/2003 | Hasty | |
| 2004/0024478 A1 | 2/2004 | Hans et al. | |
| 2004/0117845 A1 | 6/2004 | Karaoguz et al. | |
| 2004/0168081 A1 | 8/2004 | Ladas et al. | |
| 2005/0160270 A1* | 7/2005 | Goldberg | G10H 1/0025 713/176 |
| 2005/0201393 A1 | 9/2005 | Hatayama et al. | |
| 2005/0239445 A1 | 10/2005 | Karaoguz et al. | |
| 2006/0142034 A1 | 6/2006 | Wentink et al. | |
| 2006/0173976 A1* | 8/2006 | Vincent | H04L 63/08 709/220 |
| 2006/0212136 A1* | 9/2006 | Lee | H04L 12/2803 700/19 |
| 2007/0022207 A1 | 1/2007 | Millington et al. | |
| 2007/0107020 A1 | 5/2007 | Tavares | |
| 2007/0142944 A1 | 6/2007 | Goldberg et al. | |
| 2007/0169115 A1 | 7/2007 | Ko et al. | |
| 2007/0264972 A1 | 11/2007 | Stark | |
| 2008/0092204 A1* | 4/2008 | Bryce | H04N 7/163 725/143 |
| 2008/0270562 A1 | 10/2008 | Jin et al. | |
| 2008/0301779 A1 | 12/2008 | Garg et al. | |
| 2009/0081948 A1* | 3/2009 | Banks | H04R 5/02 455/3.05 |
| 2009/0305694 A1* | 12/2009 | Zheng | H04L 65/4084 455/426.1 |
| 2010/0189011 A1 | 7/2010 | Jing et al. | |
| 2010/0235242 A1 | 9/2010 | Zhao et al. | |
| 2010/0284389 A1 | 11/2010 | Ramsay et al. | |
| 2012/0005337 A1* | 1/2012 | Sokabe | G08C 17/00 709/224 |
| 2012/0054493 A1* | 3/2012 | Bradley | H04W 8/005 713/171 |
| 2012/0096125 A1 | 4/2012 | Kallai et al. | |
| 2012/0174093 A1 | 7/2012 | Davila et al. | |
| 2012/0189140 A1* | 7/2012 | Hughes | H04M 3/56 381/123 |
| 2013/0013757 A1 | 1/2013 | Millington et al. | |
| 2013/0014232 A1* | 1/2013 | Louboutin | H04M 1/72527 726/5 |
| 2013/0019266 A1 | 1/2013 | Doyle | |
| 2013/0024880 A1 | 1/2013 | Moloney-Egnatios et al. | |
| 2013/0202131 A1 | 8/2013 | Kemmochi et al. | |
| 2013/0298197 A1 | 11/2013 | Baliga | |
| 2014/0156854 A1* | 6/2014 | Gaetano, Jr. | H04L 65/1069 709/227 |
| 2014/0165121 A1 | 6/2014 | Dang et al. | |
| 2014/0192986 A1 | 7/2014 | Lee et al. | |
| 2014/0219483 A1 | 8/2014 | Hong | |
| 2014/0233755 A1 | 8/2014 | Kim et al. | |

FOREIGN PATENT DOCUMENTS

| | | |
|---|---|---|
| EP | 1389853 A1 | 2/2004 |
| EP | 1504367 A2 | 2/2005 |
| EP | 1693812 | 8/2006 |
| EP | 2478714 A1 | 7/2012 |
| JP | 2005244594 A | 9/2005 |
| JP | 2010056970 A | 3/2010 |
| JP | 2010146257 A | 7/2010 |
| JP | 2010161587 A | 7/2010 |
| JP | 2010252134 A | 11/2010 |
| WO | 2001/53994 A2 | 7/2001 |
| WO | 2003093950 A2 | 11/2003 |
| WO | 2012/030733 A1 | 3/2012 |
| WO | 2012137190 | 10/2012 |
| WO | 2012137190 A1 | 10/2012 |

OTHER PUBLICATIONS

Japanese Patent Office, Office Action dated Oct. 11, 2016, issued in connection with Japanese Application No. 2015-558167, 6 pages.
"European Supplemental Search Report dated Jan. 27, 2016, issued in connection with European Application No. 14751354.3-1905, 6 pages."
Advisory Action dated Jul. 28, 2015, issued in connection with U.S. Appl. No. 13/767,843, filed Feb. 14, 2013, 3 pages.
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.

(56) References Cited

OTHER PUBLICATIONS

Bluetooth. "Specification of the Bluetooth System: The ad hoc SCATTERNET for affordable and highly functional wireless connectivity" Core, Version 1.0 A, Jul. 26, 1999, 1068 pages.
Bluetooth. "Specification of the Bluetooth System: Wireless connections made easy" Core, Version 1.0 B, Dec. 1, 1999, 1076 pages.
Dell, Inc. "Dell Digital Audio Receiver: Reference Guide" Jun. 2000, 70 pages.
Dell, Inc. "Start Here" Jun. 2000, 2 pages.
Final Office Action dated Mar. 17, 2015, issued in connection with U.S. Appl. No. 13/767,843, filed Feb. 14, 2013, 12 pages.
Final Office Action dated May 18, 2015, issued in connection with U.S. Appl. No. 13/767,843, filed Feb. 14, 2013, 14 pages.
International Bureau, International Preliminary Report on Patentability, dated Aug. 27, 2015, issued in connection with International Application No. PCT/US2014/016578, filed on Feb. 14, 2014, 6 pages.
International Bureau, International Preliminary Report on Patentability, dated Aug. 27, 2015, issued in connection with International Application No. PCT/US2014/016580, filed on Feb. 14, 2014, 9 pages.
International Searching Authority, International Search Report dated Jun. 26, 2014, issued in connection with International Application No. PCT/US2014/016580, 3 pages.
International Searching Authority, International Search Report dated May 27, 2014, issued in connection with International Application No. PCT/US2014/016578, 6 pages.
International Searching Authority, Written Opinion dated Jun. 26, 2014, issued in connection with International Application No. PCT/US2014/016580, filed on Feb. 14, 2014, 7 pages.
International Searching Authority, Written Opinion dated May 27, 2014, issued in connection with International Application No. PCT/US2014/016578, filed on Feb. 14, 2014, 4 pages.
Jo, J. et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo Jun. 24, 2000 retrieved Jun. 18, 2014, 2 pages.
Louderback, Jim, "Affordable Audio Receiver Furnishes Homes With MP3" TechTV Vault. Jun. 28, 2000 retrieved Jul. 10, 2014, 2 pages.
Non-Final Office Action dated Sep. 1, 2015, issued in connection with U.S. Appl. No. 13/767,843, filed Feb. 14, 2013, 11 pages.
Non-Final Office Action dated Sep. 5, 2014, issued in connection with U.S. Appl. No. 13/767,843, filed Feb. 14, 2013, 11 pages.
Non-Final Office Action dated Jan. 20, 2015, issued in connection with U.S. Appl. No. 13/767,850, filed Feb. 14, 2013, 14 pages.
Notice of Allowance dated Oct. 26, 2015, issued in connection with U.S. Appl. No. 13/767,850, filed Feb. 14, 2013, 8 pages.
Palm, Inc., "Handbook for the Palm VII Handheld," May 2000, 311 pages.
Presentations at WinHEC 2000, May 2000, 138 pages.
UPnP; "Universal Plug and Play Device Architecture"; Jun. 8, 2000; version 1.0; Microsoft Corporation; pp. 1-54.
European Patent Office,European Supplementary Search Report dated Jan. 20, 2016, issued in connection with European Patent Application No. EP14751016, 9 pages.
Notice of Allowance dated Jan. 13, 2016, issued in connection with U.S. Appl. No. 13/767,843, filed Feb. 14, 2013, 10 pages.
"Denon 2003-2004 Product Catalog," Denon, 2003-2004, 44 pages.
European Patent Office, Office Action dated Nov. 15, 2016, issued in connection with European Application No. 14751016.8-1862, 4 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Chinese Patent Office, First Office Action dated Feb. 1, 2018, issued in connection with Chinese Application No. 201480022022.6, 17 pages.
Chinese Patent Office, First Office Action dated Oct. 31, 2017, issued in connection with Chinese Patent Application No. 2014800220016.0, 14 pages.
Non-Final Office Action dated Feb. 6, 2017, issued in connection with U.S. Appl. No. 15/058,872, filed Mar. 2, 2016, 9 pages.
Notice of Allowance dated May 9, 2017, issued in connection with U.S. Appl. No. 15/058,872, filed Mar. 2, 2016, 7 pages.

\* cited by examiner cation Ser. No. 13/767,850, filed on Feb. 14, 2013, entitled "Automatic Configuration of Household Playback Devices," which is incorporated herein by reference.

CONFIGURATION OF PLAYBACK DEVICE AUDIO SETTINGS

CROSS REFERENCE TO RELATED APPLICATIONS

This application claims priority under 35 U.S.C. § 120 to, and is a continuation of, U.S. non-provisional patent application Ser. No. 13/767,850, filed on Feb. 14, 2013, entitled "Automatic Configuration of Household Playback Devices," which is incorporated herein by reference.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology may be better understood with regard to the following description, appended claims, and accompanying drawings where:

Figure 1:
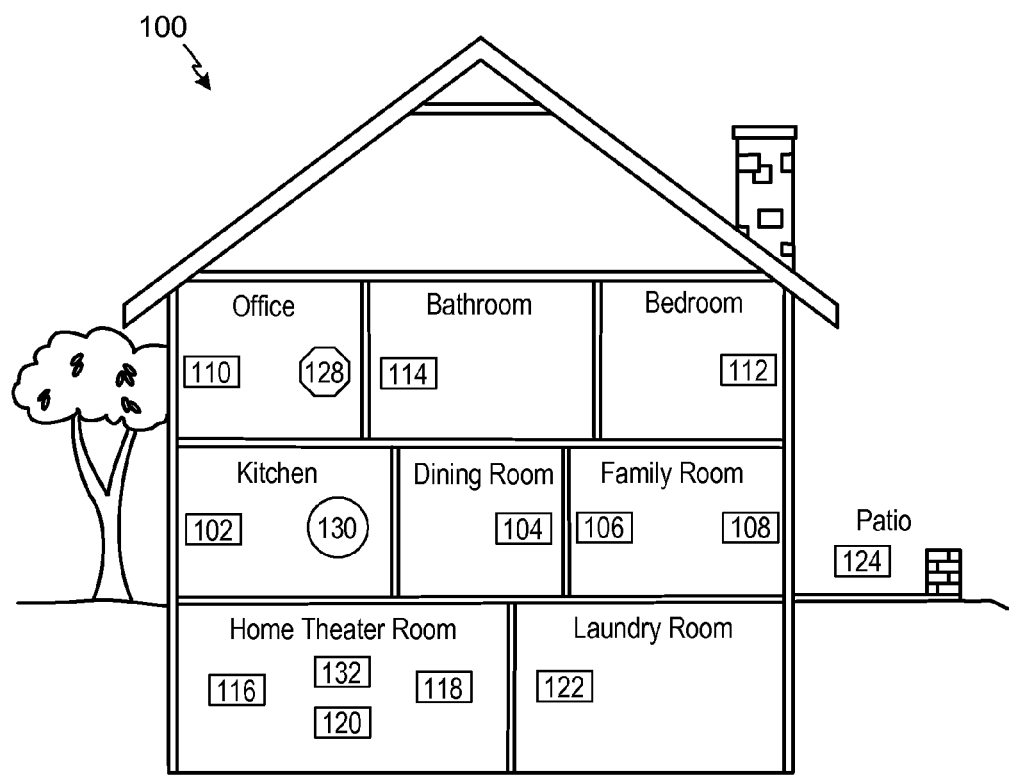
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments are described herein that may cause a playback device to be added to a secure network for media playback, and further cause the playback device to be configured. In particular, the embodiments may cause the playback device to be automatically added to the secure network without any action from a user. Further, upon joining the secure network, the playback device may be automatically configured to render media in synchrony with other playback devices in the secure network.

In one example, the user may acquire a new playback device to render media in synchrony with other playback devices that may already be configured to render media in synchrony within a secure network. In one case, upon powering up the new playback device, the new playback device may send out a join message indicating that the new playback device is available to join the secure network. If the new playback device is within communicative range of a device in the secure network, the join message may be received by the device within the secure network. The device may be another playback device or a controller device. In response to receiving the join message indicating that the new playback device is available to join the secure network, the device in the secure network may then transmit security parameters to the new playback device that can be used for the new playback device to join the secure network.

In another example, one or more devices in the secure network may be anticipating the join message from the new playback device indicating that the new playback device is available to join the secure network. For instance, the controller device may receive a configuration table listing all devices permitted to join the secure network. As such, if a device listed in the configuration is not already in the network, the controller device (and/or other devices in the secure network) may "listen" for the join message from the new playback device. In this case, the configuration table may also list the security parameters that may subsequently be sent to the new playback device for the new playback device to join the secure network.

In addition to the security parameters, the configuration table may also include configuration data or setup information for the new playback device, indicating how the new playback device should be configured for playback. For instance, if the new playback device is intended for use as one of a stereo pair to render media in synchrony with another device in the secure network, the configuration data may indicate that the new playback device will function as either a left or right channel speaker.

In one case, the new playback device may send a configuration message to the controller device (and/or other devices in the secure network) indicating that the new playback device is available or ready to be configured. In one instance, the configuration message may be received together with the join message (as a single communication instance). In another instance, the configuration message may be received after the join message, or after the new playback device has joined the secure network. In either instance, the configuration data may be communicated to the new playback device upon receiving the configuration message, and the new playback device may then be configured according to the configuration data.

In one example, the configuration table, which may include both security parameters for joining a secure network and configuration data for setting up a playback device, may be provided to the controller device and/or other devices in the secure network by a server, such as one from a "cloud" service over the Internet. In one case, the security parameters and configuration data may be, to an extent, determined based on previous input from the user. For instance, when a user acquires a new playback device, whether at a local store or over the World Wide Web, the user may be prompted to enter some identifying information and asked to answer some questions relating to how the user plans to use the new playback device. The identifying information provided by the user may indicate the secure network to which the user wishes to add the new playback device and may therefore be used to identify or determine the security parameters to be used by the new playback device to join the secure network. Similarly, the answers to the questions may indicate how the new playback device will be used and may therefore be used to generate configuration data that may be used to configure the new playback device for playback.

As suggested above, the present application involves causing a new playback device to be automatically added to a secure network and configured to render media, possibly in synchrony with other devices in the secure network, without any action by a user. In one aspect, a method is provided. The method involves receiving, by a controller device, a configuration table from a server over a wide area network, determining, by the controller device, that the configuration table includes an entry corresponding to the playback device that is unconfigured for playback, and responsively, transmitting from the controller device to the playback device, a first message comprising setup information for the playback device.

In another aspect, a controller device is provided. The controller device includes processor, memory, and instructions stored on the memory. The instructions are executable by the processor to perform functions including receiving a configuration table from a server over a wide area network, determining that the configuration table includes an entry corresponding to the playback device that is unconfigured for playback, and responsively, transmitting to the playback device, a first message comprising setup information for the playback device.

In yet another aspect, a non-transitory computer readable medium having instructions stored thereon is provided. The instructions are executable by a computing device to cause the computing device to perform functions including receiving, by a controller device, a configuration table from a server over a wide area network, determining, by the controller device, that the configuration table includes an entry corresponding to the playback device that is unconfigured for playback, and responsively transmitting, by the controller device to the playback device, a first message comprising setup information for the playback device.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 represents a home with multiple zones, though the home could have been configured with only one zone. Each zone, for example, may represent a different room or space, such as an office, bathroom, bedroom, kitchen, dining room, family room, home theater room, utility or laundry room, and patio. A single zone might also include multiple rooms or spaces if so configured. One or more of zone players 102-124 are shown in each respective zone. A zone player 102-124, also referred to as a playback device, multimedia unit, speaker, player, and so on, provides audio, video, and/or audiovisual output. A controller 130 (e.g., shown in the kitchen for purposes of illustration) provides control to the media system configuration 100. Controller 130 may be fixed to a zone, or alternatively, mobile such that it can be moved about the zones. The media system configuration 100 may also include more than one controller 130. The media system configuration 100 illustrates an example whole house media system, though it is understood that the technology described herein is not limited to its particular place of application or to an expansive system like a whole house media system 100 of FIG. 1.

a. Example Zone Players

Figure 2A:
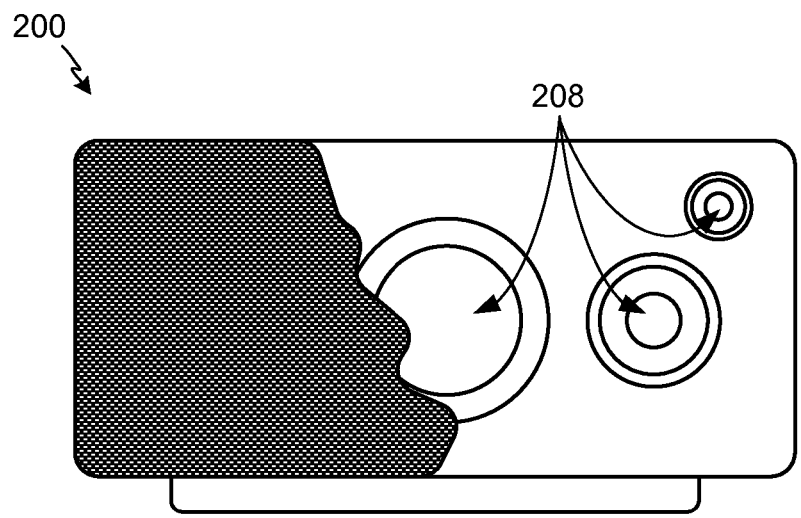
FIG. 2A shows an illustration of an example zone player having a built-in amplifier and transducers.
Figure 2B:
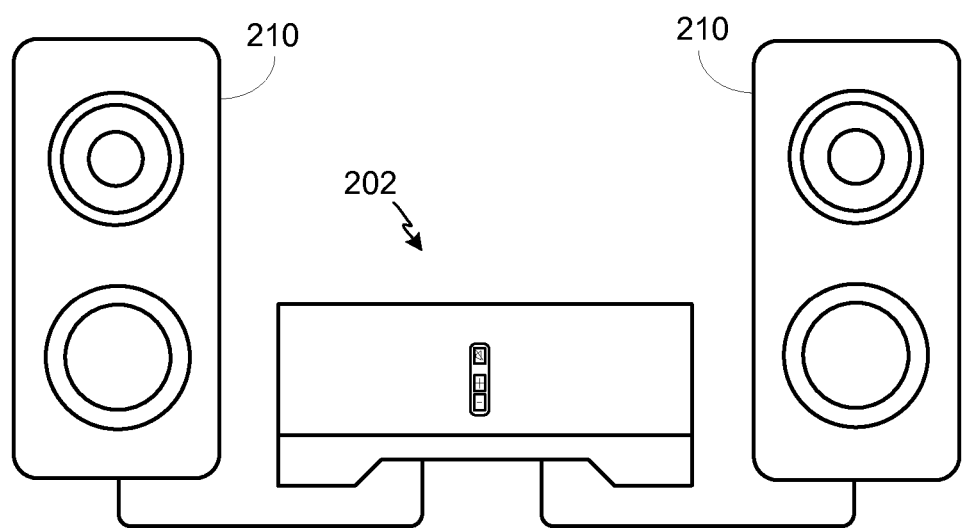
FIG. 2B shows an illustration of an example zone player having a built-in amplifier and connected to external speakers.
Figure 2C:
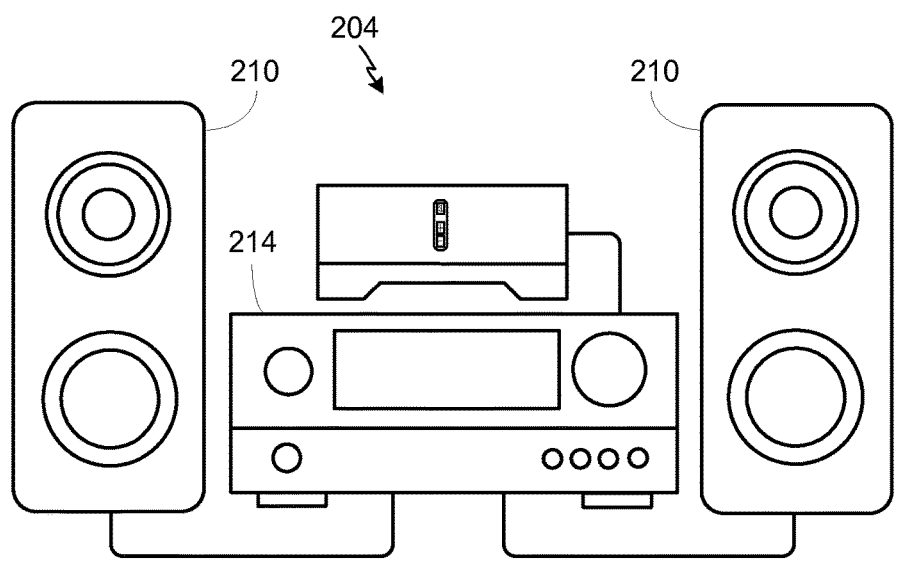
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128 (described further below), from the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, California presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
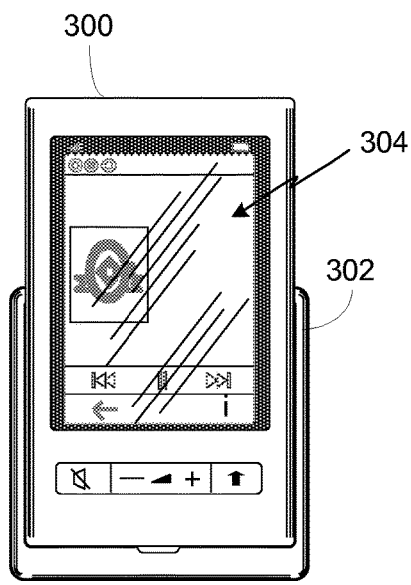
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided, may be used to charge a battery of controller 300. In some embodiments, controller 300 may be provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100, each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Zone Players

Figure 4:
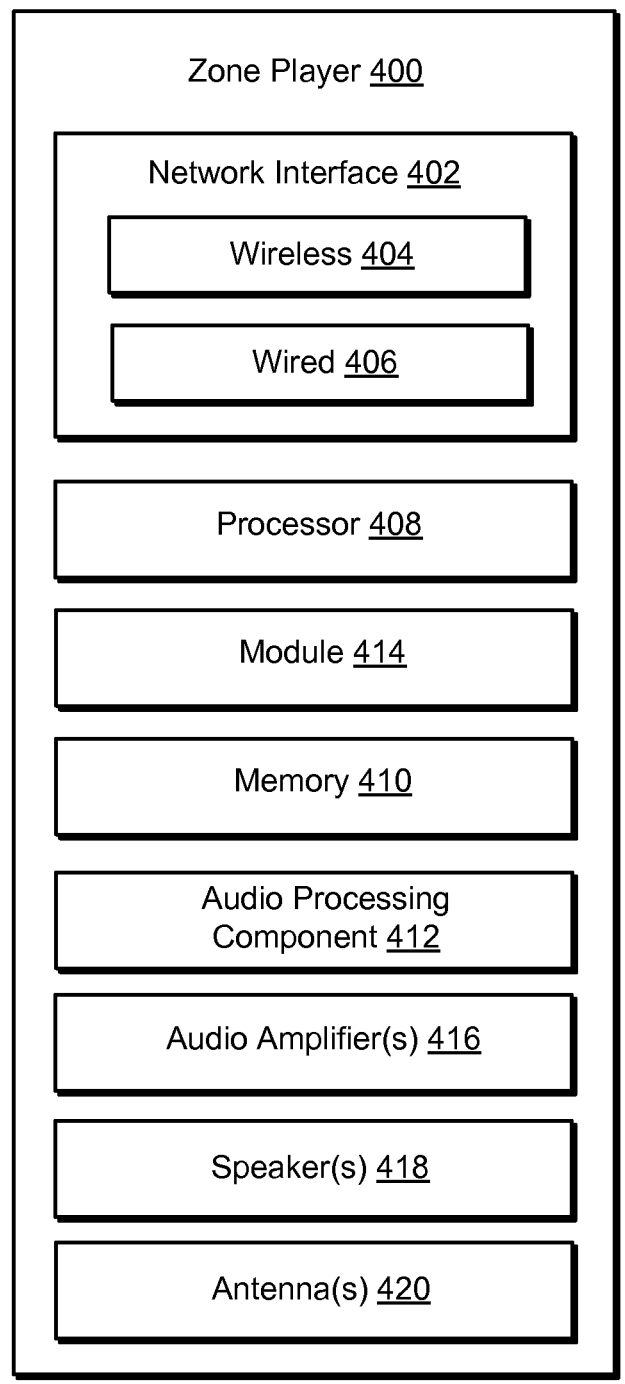
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY:5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
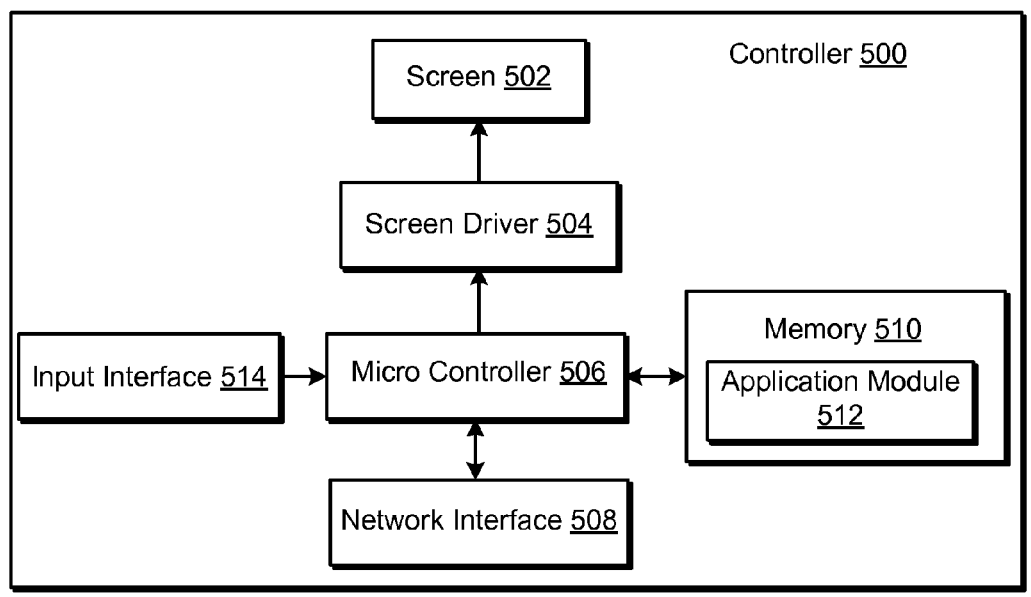
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™ IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
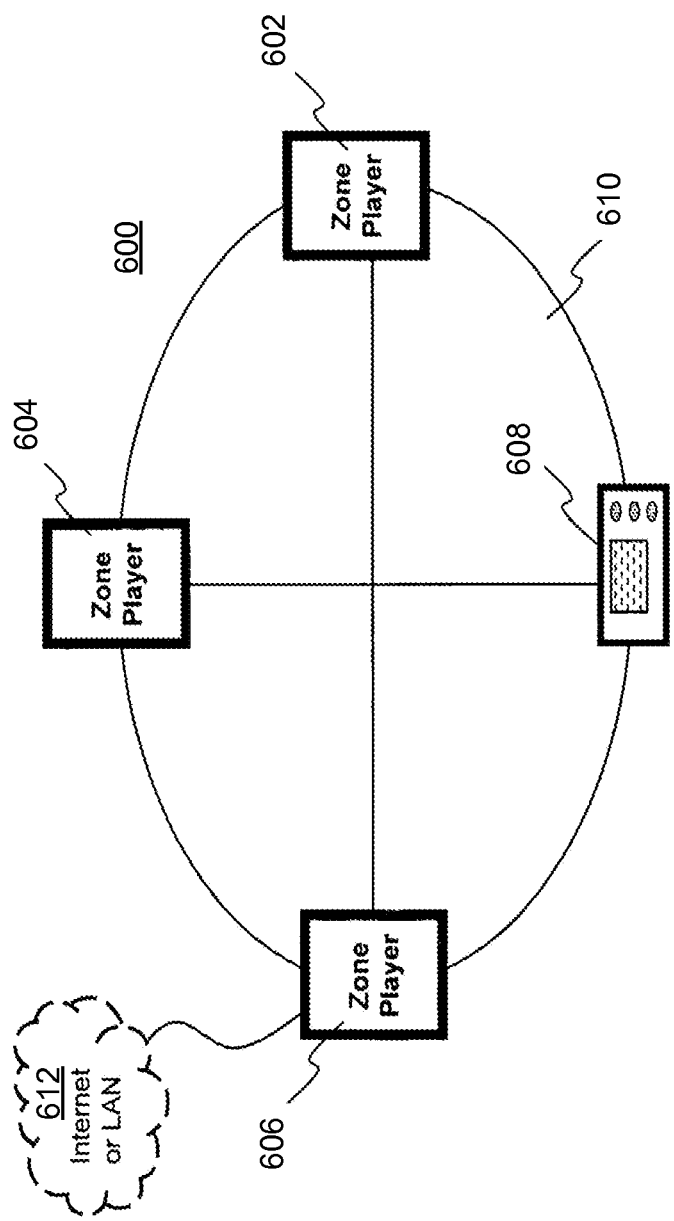
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may join and/or leave from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., the Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example System Configuration

Figure 7:
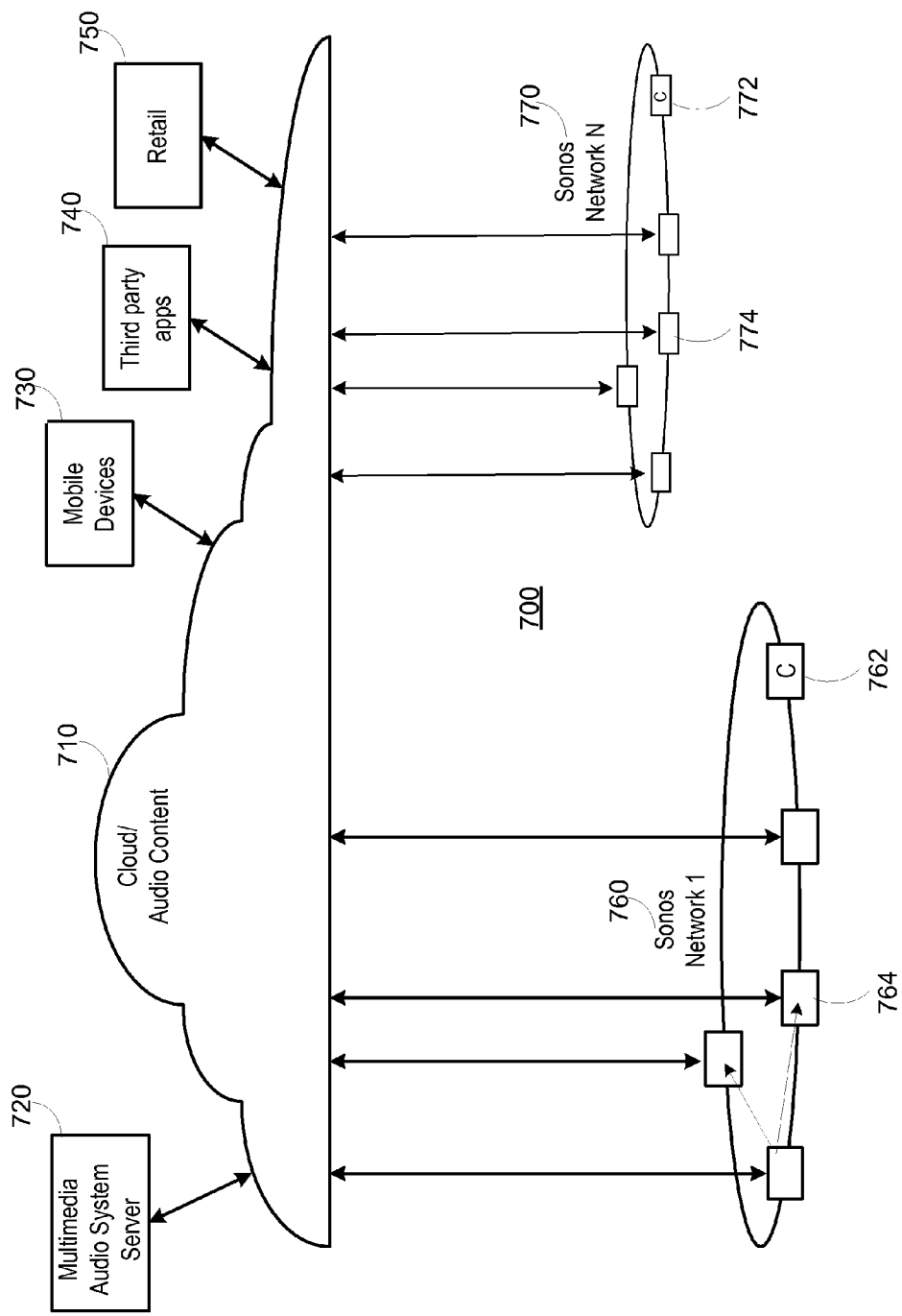
FIG. 7 shows a system including a plurality of networks including a cloud-based network and at least one local playback network.

FIG. 7 shows a system including a plurality of networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example.

Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a multimedia audio system server 720 (e.g., Sonos™), a mobile device 730, a third party application 740, a content provider 750 and so on can provide multimedia content (requested or otherwise) to local playback networks 760, 770. Within each local playback network 760, 770, a controller 762, 772 and a playback device 764, 774 can be used to playback audio content.

VII. Example Automatic Connection and Configuration of a Playback Device

As discussed above, embodiments are described herein that may cause a zone player to automatically be added to a secure network for synchronized media playback, and further cause the zone player to automatically be configured to render media in synchrony with other playback devices in the secure network.

Figure 8A:
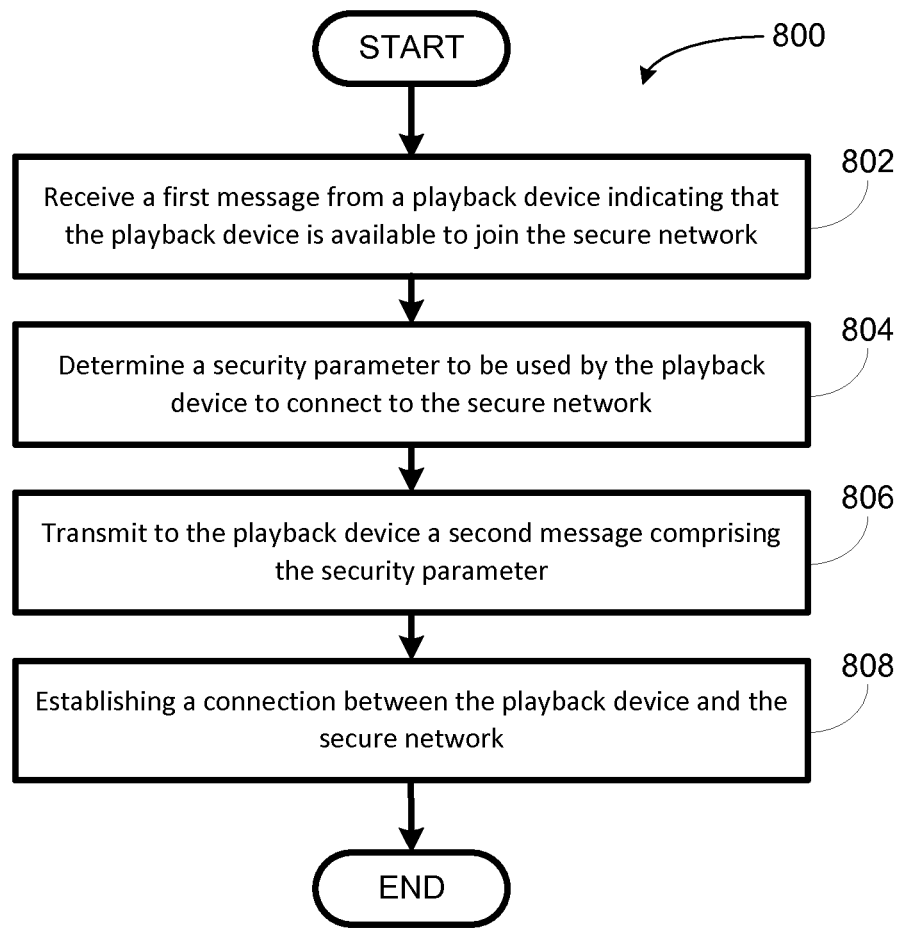
FIG. 8A shows a first example flow diagram for automatically adding a playback device to a secure playback network.

FIG. 8A shows a first example flow diagram of a method 800 for automatically adding a playback device to a secure playback network, in accordance with at least some embodiments described herein. Method 800 shown in FIG. 8A presents an embodiment of a method that could be used in the environments 100, 600, and 700 with the systems 200, 202, 204, 300, 400, and 500 for example, in communication with one or more devices, such those illustrated in FIGS. 2-5. Method 800 may include one or more operations, functions, or actions as illustrated by one or more of blocks 802-808. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

At block 802, the method 800 may involve receiving a first message from a playback device indicating that the playback device is available to join a secure network for synchronized rendering of media. In some discussions herein, the secure network of playback devices configured to render media in synchrony may also be referred to as a playback system. As mentioned above, a new zone player, upon being powered up, may send out the first message, which may be a "join message," for example, indicating that the zone player is available to join the secure network for media playback. The first message may also be other types of messages, such as an "alive message" announcing a presence of the new zone player. In this case, the alive message may implicitly indicate that the new zone player is available to join the secure network. The transmission of the join message from the new zone player to the secure network may occur over a wired or wireless network, such as a wide area network (WAN) or local area network (LAN) for example. As such, the new zone player may be configured to transmit the join message over the WAN or LAN upon being powered up.

The WAN or LAN may be a secure or insecure network. In the case the WAN or LAN is a secure network (separate from the secure playback system network), the new zone player may be pre-configured with security parameters to communicate over the secure network. In one case, the pre-configured security parameters may be provided by the user when acquiring the new zone player.

In another case, WAN or LAN may be an insecure network. In such a case, the new zone player may be pre-configured to transmit the join message over a particular unsecure WAN or LAN network that devices in the secure network may also communicate over. For instance, the new device may be configured to transmit the join message over the unsecure network according to a specific communication protocol. For example, the join message may include specific prefixes. In this case, devices in the secure network may be preconfigured to accept messages over the unsecure network if the message follows the specific communication protocol.

In one case, the join message may be transmitted by the new zone player without any specific action or input from a user after the new zone player is powered up. In other words, no button-pressing or other actions is required from the user (besides perhaps plugging the zone player into a power outlet) for the zone player to transmit the join message.

In another case, the join message may be automatically transmitted by the new zone player or another zone player that may or may not be in the secure network, upon a completion of a boot cycle by the zone player subsequent to the initial powering up of the zone player. In other words, the user may reboot a zone player, which may or may not already be in the secure network, and would not need to perform any additional actions to cause the join message to be transmitted by the zone player.

In one case, the secure network may be a playback system including one or more other playback devices such as the zone players 200, 202, 204, or 400, or one or more controllers such as controllers 300 and 500 as described above. If one or more of the other zone players or controllers are within communicative range of the new zone player, the join message may be received by the playback system via one or more of the other zone players or controllers in the secure network. In one example embodiment, the device (e.g., zone player or controller) that is within communicative range of the new zone player may forward the join messages that is received from new zone players to another device (e.g., zone player or controller) in the playback system for processing.

In one example, the join message received from the new zone player may include data identifying the new zone player. For instance, the join message may indicate a serial number or model name of the new zone player. The identifying data provided by the new zone player may then be used to determine how the new zone player may be added to the secure network, if the new zone player is allowed to join the secure network at all.

At block 804, the method 800 may involve determining a security parameter to be used by the playback device to connect to the secure network. In one example, each zone player may use the same security parameter to connect to the secure network. The security parameter may include a password, and/or a specific communication protocol. In another example, different zone players may be connected to the secure network using different security parameters. For instance, a controller device may be added to the secure network according to different security parameters as a zone player. As stated above, the join message provided by the new zone player may be used to determine how the new zone player may be added to the secure network, if the new zone player is allowed to join the secure network. As such, the identifying data may be used to determine the security parameter to be used by the new zone player to join the secure network.

At block 806, the method 800 may involve transmitting to the playback device a second message comprising the security parameter. Upon determining the security parameters to be used by the new zone player to join the network, one of the one or more devices in the secure network may transmit to the new zone player a connection message (or "the second message," as recited above) including the security parameters to configure the new zone player's connection to the secure network. The transmission of the connection message from the secure network to the new zone player may be over the same or a similar wired or wireless communication protocol over which the new zone player transmitted the join message. The connection message may be encrypted to avoid unauthorized devices to determine the security parameter.

In one case, the connect message may include data identifying the playback system of which the new zone player will become a part. For example, the connect message may include data indicating a household identifier (HHID), as discussed previously. In such a case, the connection message may further include data identifying each of the other one or more devices already connected within the secure network. Such data identifying other devices in the secure network may allow the new zone player to also establish individual connections to each of the other devices in the secure network.

At block 808, the method 800 may involve establishing a connection between the playback device and the secure network. As suggested above, the connection between the new zone player and the secure network may involve communication between the new zone player and other devices in the playback system according to a specific communication protocol as defined by the security parameters determined at block 804 and provided to the new zone player at block 806. In one example, upon establishing the connection between the new zone player and the playback system, the new zone player may transmit a confirmation message to the playback system over the newly established secure connection to confirm that the new zone player has joined the secure network. As such, a playback device may be automatically added to a secure network of playback devices without any particular input or action from the user.

Also as suggested above, establishing a connection between the new zone player and the secure network may involve the new zone player establishing individual connections with each of the other devices in the secure network such that the new zone player may communicate with each of the other devices in the secure network either directly or through one or more of the other devices also in the secure network. In one example, establishing the connection between the new zone player and the secure network may involve adding the new zone player to a mesh network as discussed previously, if the secure network of the playback system is configured according to a mesh topology.

In discussions thus far, the playback system (or one or more devices within the secure network) may receive the join message from the new zone player if the zone player and one or more devices in the secure network are within communicative range. This may involve the one or more devices in the secure network to regularly be available to receive a join message in case there is a new zone player in communicative range. A method 830 may be provided such that the one or more devices in the secure network may be configured to be available to receive a join message when a join message from a new zone player is expected.

Figure 8B:
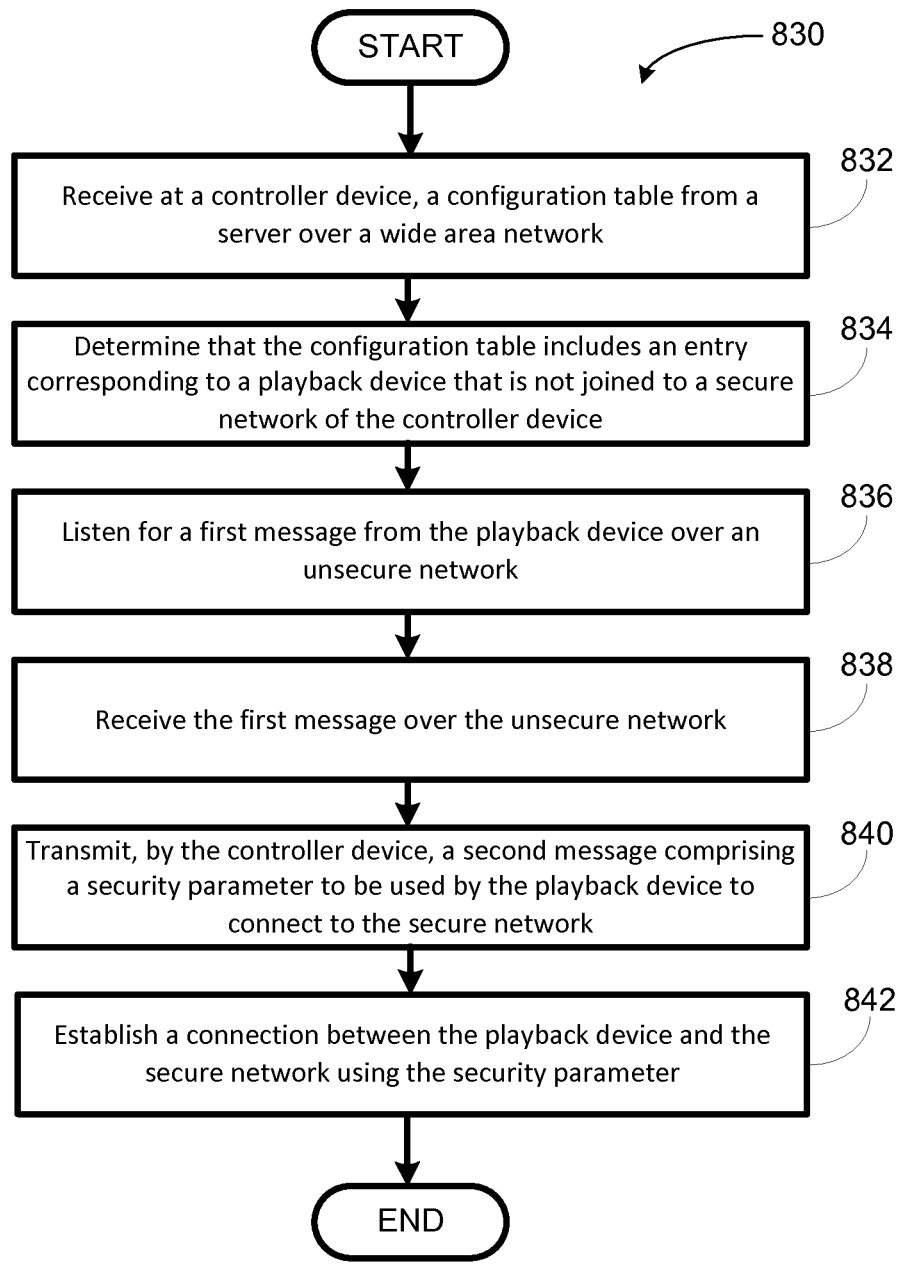
FIG. 8B shows a second example flow diagram for automatically adding a playback device to a secure network.

FIG. 8B shows a second example flow diagram of the method 830 for automatically adding a playback device to a secure network, in accordance with at least some embodiments described herein. Method 830 shown in FIG. 8B presents an embodiment of a method that could be used in the environments 100, 600, and 700 with the systems 200, 202, 204, 300, 400, and 500 for example, in communication with one or more devices, such as those illustrated in FIGS. 2-5. Method 830 may include one or more operations, functions, or actions as illustrated by one or more of blocks 832-842. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 832, the method 830 may involve receiving at a controller device, a configuration table from a server. The controller device, in this case, may be a device such as the controllers 300 and 500 discussed previously in connection to FIGS. 3 and 5, and may be within the secure network of one or more other playback devices (or zone players) discussed above for rendering media in synchrony. In another case, the controller device may be in communication with one or more playback devices in the secure network, but not actually within the secure network of playback devices. In other words, the controller device may be in a same HOUSEHOLD, but not within the same secure network as the one or more playback devices. As suggested previously in connection to receiving a join message from a new zone player, playback devices within communicative range of one another may forward messages (such as join or configure messages) to each other. As such, the controller device may receive, via the other playback devices, the join message if the controller device is not within the secure network of one or more playback devices. In a further example, messages may be forwarded beyond the present HOUSEHOLD. For instance, messages may be forwarded to devices in another HOUSEHOLD on a same local area network, or over the Internet.

As mentioned before, the configuration table may include a list of all devices within the same HOUSEHOLD as the controller device, and respective security parameters for each device on the list to communicate with one another within the secure network. In another case, as will be further discussed below, the configuration table may also include data indicating how devices in the playback system should be configured for rendering media.

In one example, the controller device may be configured to store a copy of the configuration table listing information associated with devices in the playback system. In such a case, a previously stored configuration table may be deleted and replaced by a newly received configuration table when received by the controller device. In another case, the configuration table transmitted to the controller device may only include data associated with devices for which new configurations exist, or with new devices to be added to the secure network. In other words, the configuration table transmitted to the controller device may be a "change-list" instead of a full configuration table. In another example, the controller may be configured to process and parse the configuration table, distribute or apply the data associated with the devices in the playback system to the respective devices, and subsequently delete rather than store the received configuration table.

As indicated previously, the server transmitting the configuration table may be one that is part of a cloud network, and in one case, the configuration table may be received by the controller device over a WAN in communication with the cloud network. In one example, the server may be the multimedia audio system server 720 described previously in connection to FIG. 7. The transmission of the configuration table from the server to the controller device may be triggered by a number of actions, or combination of actions. For instance, the transmission of the configuration table may be requested by the controller devices, or be configured to occur at regular, predetermined intervals of time. In some cases, the configuration table maybe transmitted only if a change in configuration for a device in the playback system is present, regardless of whether a request has been made by the controller device. In another instance, the configuration table may be "pushed" by the server.

In one example, the controller device may request the configuration table from the server by sending a request message to the server. The server, in response to receiving the request message, may then determine or compile a configuration table associated with the controller device (and other devices within the same secure network as the controller device), and transmit the configuration table to the controller device. In some cases, the controller device may be configured to send the request message at regular intervals such that the configuration table may remain up-to-date.

In another example, the server may transmit the configuration table to the controller device without solicitation by the controller device. This may be the case when an update to data associated with devices in the playback system is provided to the server, or if a new zone player has been acquired to become a device in the playback system, but that has not been configured to join the secure network. In other words, the cloud network server may determine whether the controller device or any device in the secure network should receive an updated configuration table, and transmit the configuration table accordingly.

In one example, the received configuration table may include data associated with devices that may or may not already be in the playback system. At block 834, the method 830 may involve determining that the configuration table includes an entry corresponding to a playback device that is not joined to a secure network of the controller device. In one example, the controller device may compare the newly received configuration table against a previously stored configuration table to determine if any entries for one or more new devices are present. In another example, the controller device may ping via the secure network, each device in the secure network and determine that a device, such as a zone player listed in the configuration table, is not joined to the secure network if no response to the ping is received. In a further example, the configuration table may further include data indicating that a particular device listed in the configuration table is new.

After receiving the configuration table and identifying that a device should be connected to the secure network, the controller may therefore anticipate receiving a join message from the new device. At block 836, the method 830 may involve listening for a first message from the playback device. The anticipated first message may in effect be the join message indicating that the new zone player is available to join the secure network, as discussed previously in connection to the method 800 of FIG. 8A. Since the new zone player has not already joined the secure network, the join message may be received over an unsecure network, or a network such as a WAN or LAN, also as discussed previously.

In one case, zone players in the playback system may be configured to not detect or receive messages over unsecure networks during regular operation. In such a case, listening for the join message may involve the zone players in the playback system becoming available to receive messages over the unsecure network in anticipation of the join message transmitted over the unsecure network.

In another case, the new device may be configured to transmit the join message over the unsecure network according to a specific communication protocol. For example, the join message may include specific prefixes. In this case, listening for the join message may involve accepting messages over the unsecure network if the message follows the specific communication protocol.

In either case, the controller device, or any other device in the playback system may then be listening for the anticipated join message. At block 838, the method 830 may then involve receiving the first message over the unsecure network, similar to block 802 of the method 800 discussed above in connection to FIG. 8A, and at block 840, the method 830 may involve transmitting, by the controller device, a second message comprising a security parameter to be used by the playback device to connect to the secure network, similar to block 806 of the method 800 discussed above. In one example, the security parameter to be used by the playback device to connect to the secure network may be provided in the configuration table. In another example, the security parameter may be determined by the controller device or one or more other devices in the playback system according to security parameters used by the controller device and/or other devices in the playback system to connect to the secure network. Subsequently at block 842, the method 830 may involve establishing a connection between the playback device and the secure network using the security parameter, similar to block 808 of the method 800 as discussed above. As such, a playback device may be automatically added to a secure network of playback devices without any particular input or action from the user.

After a connection between the controller device and the secure network has been established, the configuration table may be deleted from the controller device. This, of course, may occur after any other secure network connections by or configuration updates to devices in the playback system has been completed. In another case, the controller device may remove from the configuration table, the entry corresponding to the playback device as soon as connection between the playback device and the secure network has been established, rather than after all other connections or configurations have been processed.

Figure 8C:
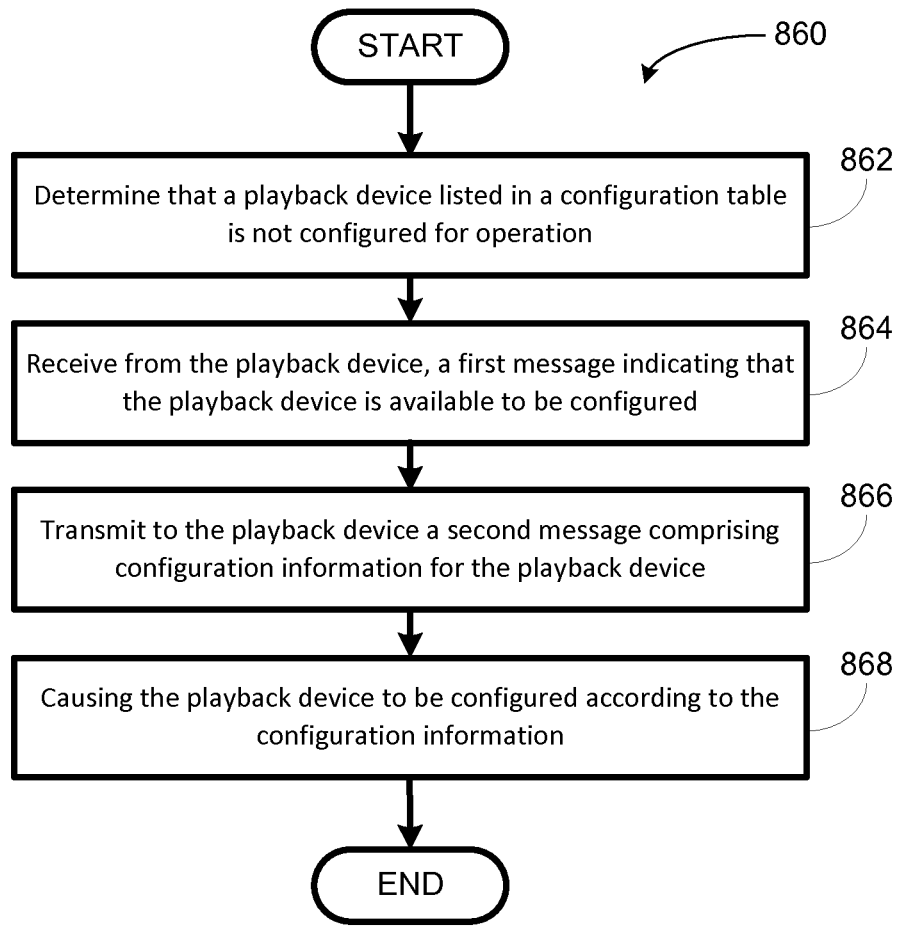
FIG. 8C shows an example flow diagram for automatically configuring a playback device in a playback network.

As indicated above, in addition to a list of devices that may join the secure network and security parameters that may be used by the list of devices to join the secure network, the configuration table may also include data indicating how each device in the playback system should be configured for rendering media. FIG. 8C shows an example flow diagram of a method 860 for automatically configuring a playback device in a playback network, in accordance with at least some embodiments described herein. Method 860 shown in FIG. 8C presents an embodiment of a method that could be used in the environments 100, 600, and 700 with the systems 200, 202, 204, 300, 400, and 500 for example, in communication with one or more devices, such those illustrated in FIGS. 2-5. Method 860 may include one or more operations, functions, or actions as illustrated by one or more of blocks 862-868. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

At block 862, the method 860 may involve determining that a playback device listed in a configuration table is not already configured for operation. As with the discussion of method 830, the configuration table in this discussion of the method 860 may be received from a cloud server, such as the multimedia audio system server 720 in FIG. 7, over a wired or wireless network, such as a WAN or LAN. In one example, determining that the playback device listed in the configuration table is not configured for operation may be similar to determining that the configuration table includes an entry corresponding to a playback device that is not joined to a secure network of the controller device, as discussed above in connection to block 834 of the method 830. For instance, the controller device may receive a configuration table indicating a new playback device that is not joined to the secure network of the controller device. In this case, if the new playback device is not joined to the secure network, then the new playback device may not have been configured for operation to render media in synchrony with other devices in the playback system. In another case, if new firmware is available the devices in the playback system, and one or more devices in the playback system has not been upgraded with the new firmware, then the one or more devices that have not been updated may be considered as not having been configured for operation. In a further case, the controller device may be configured to ping each device in the playback system for present configuration settings, and if a device does not respond, or responds with a configuration that does not match that listed in the configuration table for the particular device, then the particular device may be considered as not having been configured for operation.

Upon determining that a playback device in the playback system is not configured for operation, the controller device and/or other devices in the playback system may then listen for a configuration message from the unconfigured device indicating that the device is available to be configured. If the unconfigured device is already connected to the secure network, then the controller device may listen for the configuration message over the secure network. If the unconfigured device is not already connected to the secure network, then the controller device may listen for the configuration message over an unsecure network, similar to how the controller device may listen for a join message as described above in connection to the method 830 of FIG. 8B. In this case, the configuration message may be part of a same message as the join message.

At block 864, the method 860 may involve receiving from the playback device a first message indicating that the playback device is available to be configured. As stated above, the configuration message (or the "first message," as recited above) may be received along with, or as part of the join message from the new playback device over the unsecured wired or wireless network. In another example, the configuration message may be received after the join message. In this case, the configuration message may be transmitted from the new playback device over the secure network after the new playback device has joined the secure network.

In response to receiving the configuration message, at block 866 of method 860 may involve transmitting to the playback device, a second message comprising configuration data (i.e. setup information) for the playback device. In other words, the controller device (and/or one or more of the other devices in the playback system) may transmit a settings message (the "second message") to the new zone player to provide configuration data to the new playback device upon receiving the configuration message indicating that the new playback device is available to be configured. The information in the settings message may be derived from the configuration table. In the case the configuration message is received along with the join message, or before a secure connection has been established between the new playback device and the playback system, the settings message may be transmitted to the new playback device along with, or as a part of the connection message that includes security parameters for the new playback device to join the secure network.

In another example, block 866 may involve transmitting the settings message to the new playback device (or, as discussed previously, any device in the playback system that is not configured for operation in the secure network) whether or not the configuration message has been received. In other words, the controller device may push the settings message to any device that may require an initial configuration or a configuration update.

At block 868, the method 860 may involve causing the playback device to be configured according to the configuration data. Upon receiving the settings message from the controller device, the new playback device may now be configured according to the configuration data provided via the settings message. As indicated, the new playback device, or any device in the secure network may be configured to render media in synchrony with other devices in the secure network. As such, the configuration data for configuring a playback device may indicate audio playback settings for the playback device.

In one example, the new playback device may be intended for use as a component of a bonded zone of playback devices. As suggested previously, a bonded zone of playback devices may involve a group of two or more players in a designated zone that renders the same or different channels of an audio signal in a synchronized fashion, such that the players render audio content with no (or substantially no) audible delays or hiccups. Players may be grouped and ungrouped into bonded zones dynamically, and bonded zones may be further grouped with other players and/or bonded zones to create another bonded zone. Bonded zones may further be described in terms of a "paired player" or a "consolidated player".

A paired player may involve a bonded zone, whereby the players may play different audio channels of audio content. For example, a "stereo pair" is a paired player created by grouping two players in a bonded zone to play 2-channel audio. In one case, bonding the two players in the stereo pair may result in a left channel player and a right channel player. A consolidated player may involve a bonded zone, whereby the players are grouped to render a frequency range, or portion of a frequency range of audio content. In one example, a consolidated player may be created by grouping a full-range player with a low-frequency player (e.g. subwoofer). In this case, the full-rage player may be configured to render the mid and high frequency range of the audio content, while the low-frequency player may be configured to render just the low-frequency range of the audio content.

Referring back to block 868, in the case the new playback device is intended for use as one of a stereo pair to render media in synchrony with another device in the secure network, the configuration data may indicate that the new playback device will function as either a left or right channel speaker. In one case, the new playback device may be configured such that the new playback device will render a left channel audio component of media, for example. In such a case, a zone player already in the secure network may also be re-configured to render the other, right channel audio component of media as a result of the addition and configuration of the new playback device to create the stereo pair.

The configuration data may also indicate audio equalization settings for the new playback device, and configuration of the new playback device may also involve changing the audio equalization settings of the new playback device accordingly. In such a case, if the new playback device is also being added to a bonded zone, the audio equalization settings of one or more of the other zone players in the bonded zone may also be adjusted as a result.

In addition to settings associated with audio rendering of the new playback device, the configuration data may also indicate user interface and user experience related settings. For example, the configuration data may include a user-readable name to be assigned to the new playback device. As such, the new playback device may be identified as the user-readable name when the user sees the new playback device on a control interface for the playback system. Similarly, the configuration data may include registration information for one or more music services to be registered to the playback system, and accordingly, configuration of the new playback device may involve setting up the new playback device to access the one or more music services. Other example configuration settings may also be possible.

Upon completion of configuration according to the configuration data, the new zone player may then transmit a confirmation message to the controller device, or one or more other devices in the playback system indicating that configuration was completed. As such, a playback device may be automatically configured for operation within a secure network of playback devices without any particular input or action from the user.

As indicated above, the configuration data in the configuration table provided to the controller device and based upon to configure a new playback device (or other devices already within the secure network) may be, to an extent, determined based on previous input from the user. In one example, if the user purchased the new playback device from an online retailer on the World Wide Web, the user may be prompted during check-out to provide the configuration data, or information that may be based upon to determine the configuration data. In another example, if the user purchased the new playback device at a store, the user may be prompted at the point-of-sale (by a sales associate, for example) to provide the configuration data, or information that may be based upon to determine the configuration data. In a further example, the user may be prompted via email shortly after acquiring the new playback device (either at the store or from an online retailer) to provide the corresponding configuration data or information via a web interface linked to in the email.

Information that may be used to determine the configuration data may include what the new playback device is intended for (e.g. part of a bonded zone or stereo pair), the names of other players that the new playback device will be connected with, where the new zone player will be used (e.g. kitchen, bedroom, living room), what type of music the user enjoys (e.g. rock, jazz, classical), if the device is to be part of a bonded zone, or the name of the playback device. The type of music the user enjoys may be based upon to determine audio equalization settings for the new playback device, as discussed above. In addition, the user may also enter identifying information of the user such as a username or email such that media services that the user has access to may be determined, and configuration data for registering the new playback device for access to the media services may be determined. In some cases, the identifying information may be automatically determined with minimal or no input from the user. For instance, if the user purchased the new playback device using a personal device such as a smart phone or computer having the identifying information stored thereon, the identifying information may be automatically retrieved from the controller application.

Figure 9A:
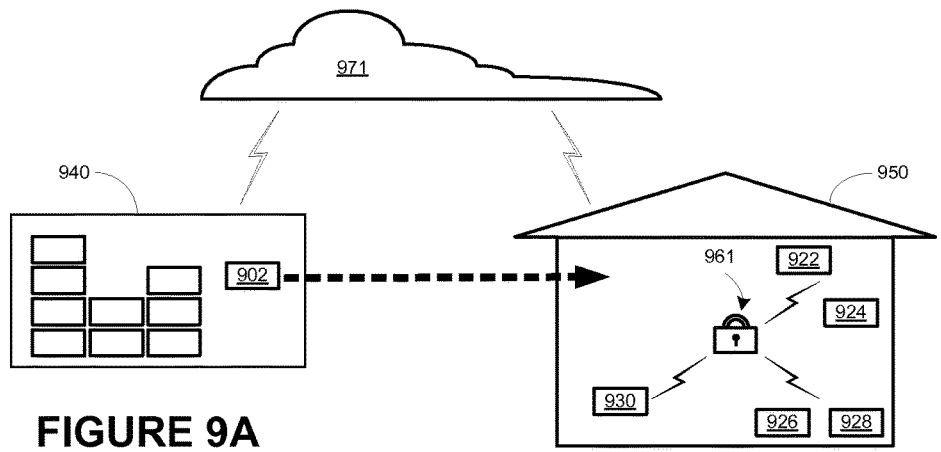
FIG. 9A shows a first scenario for adding a playback device to, and configuring the playback device for a secure playback network.
Figure 9B:
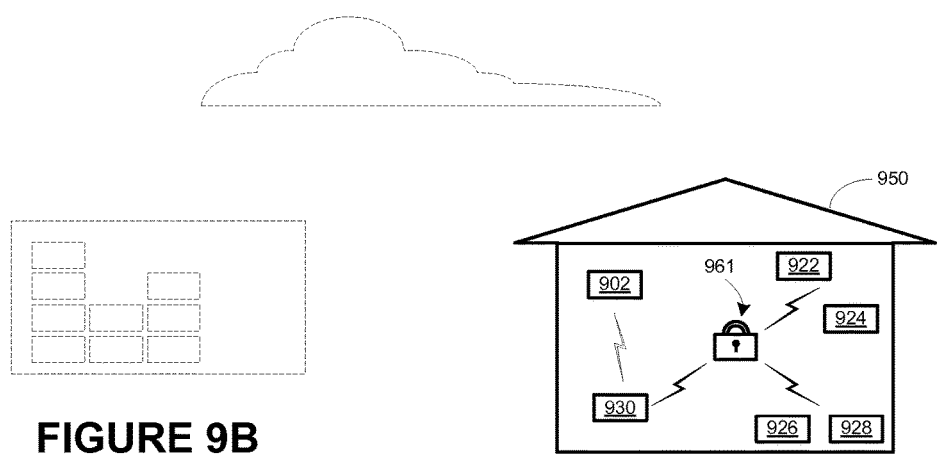
FIG. 9B shows a second scenario for adding a playback device to, and configuring the playback device for a secure playback network.
Figure 9C:
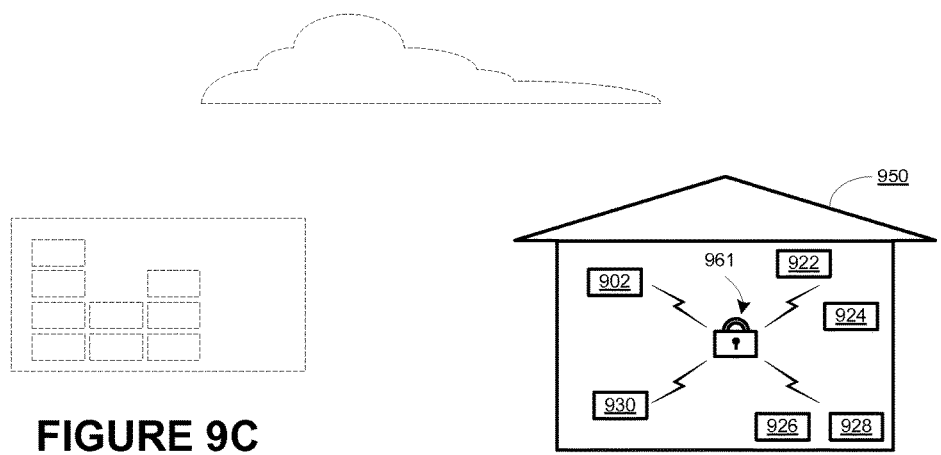
FIG. 9C shows a third scenario for adding a playback device to, and configuring the playback device for a secure playback network.

To further describe the automatic setup of playback device, including the joining of a secure network and configuration of the playback device for media playback, a series of scenarios are presented in FIG. 9A, 8B, and 9C to illustrate an example acquisition and configuration of a new playback device.

FIG. 9A shows a first scenario for adding a playback device to, and configuring the playback device for a secure playback network. As shown, the first scenario may involve a cloud network 971, a warehouse 940, and a household 950.

The warehouse 940 may be a warehouse for a manufacturer, for a store, or for an online retailer, and may contain a number of playback devices including a zone player 902. The household may include a number of playback devices including a controller 930 and zone players 922, 924, 926, and 928. As shown, the controller 930 and zone players 922, 924, 926, and 928 may be in communication with each other over a secure network 961.

In the first scenario, the zone player 902 may be acquired by a user to be used in the household 950. Upon acquiring the zone player 902, the user may be prompted to provide information about the user, and information relating to how the zone player 902 will be used. The answers provided by the user may then be associated with specifically the zone player 902. For instance, a serial number of the zone player 902 and the answers provided by the user may be provided to the cloud network 971, where the serial number and the answers may become associated, and where configuration data may be determined for the zone player 902. In this case, the user may provide information indicating that the zone player 902 will be added to the secure network 961 in the household 950. As such, configuration data associated with the zone player 902 may indicate that the zone player 902 will be added to the secure network 961.

The configuration data may then be provided by the cloud network 971 to the secure network 961, or to a device in the secure network 961, such as the controller 930. Referring back to the discussions of the methods 800 and 830 described in connection to FIG. 8A and 8B, the secure network 961 (and devices within the secure network 961) may then listen for a join message from the new zone player 902.

FIG. 9B shows a second scenario for adding a playback device to, and configuring the playback device for a secure playback network. As shown, the new zone player 902 may have arrived at the household 950, been powered up by the user, and may now be in communicative range of the secure network 961. The zone player 902 may then transmit the join message to the controller 930 over an unsecure network. In response, the controller 930 may transmit a connection message to the zone player 902 with information on how the zone player 902 may join the secure network. In another example, the zone player 902 may also transmit a configuration message to the controller 930 indicating that the zone player 902 is available to be configured. In this case, the controller 930 may also transmit a settings message with information on how the zone player 902 should be configured.

FIG. 9C shows a third scenario for adding a playback device to, and configuring the playback device for a secure playback network. As shown, the zone player 902 may have successfully joined the secure network 961 and may be communicating with any of the devices 930, 922, 924, 926, and 928 over the secure network 691. If the zone player 902 has not already been configured, the zone player 902 may then transmit a configuration message over the secure network 961 to one or more of the other devices in the secure network 961 and subsequently receive a settings message indicating how the zone player 902 should be configured. As such, aside from providing configuration data or information indicating an intended use of the new zone player 902 when first acquiring the zone player, and subsequently powering up the new zone player 902 within the household 950, no additional action or input from the user is required for the new zone player 902 to join the secure network 961, and be configured to render media in synchrony with other devices in the secure network 961.

Figure 10:
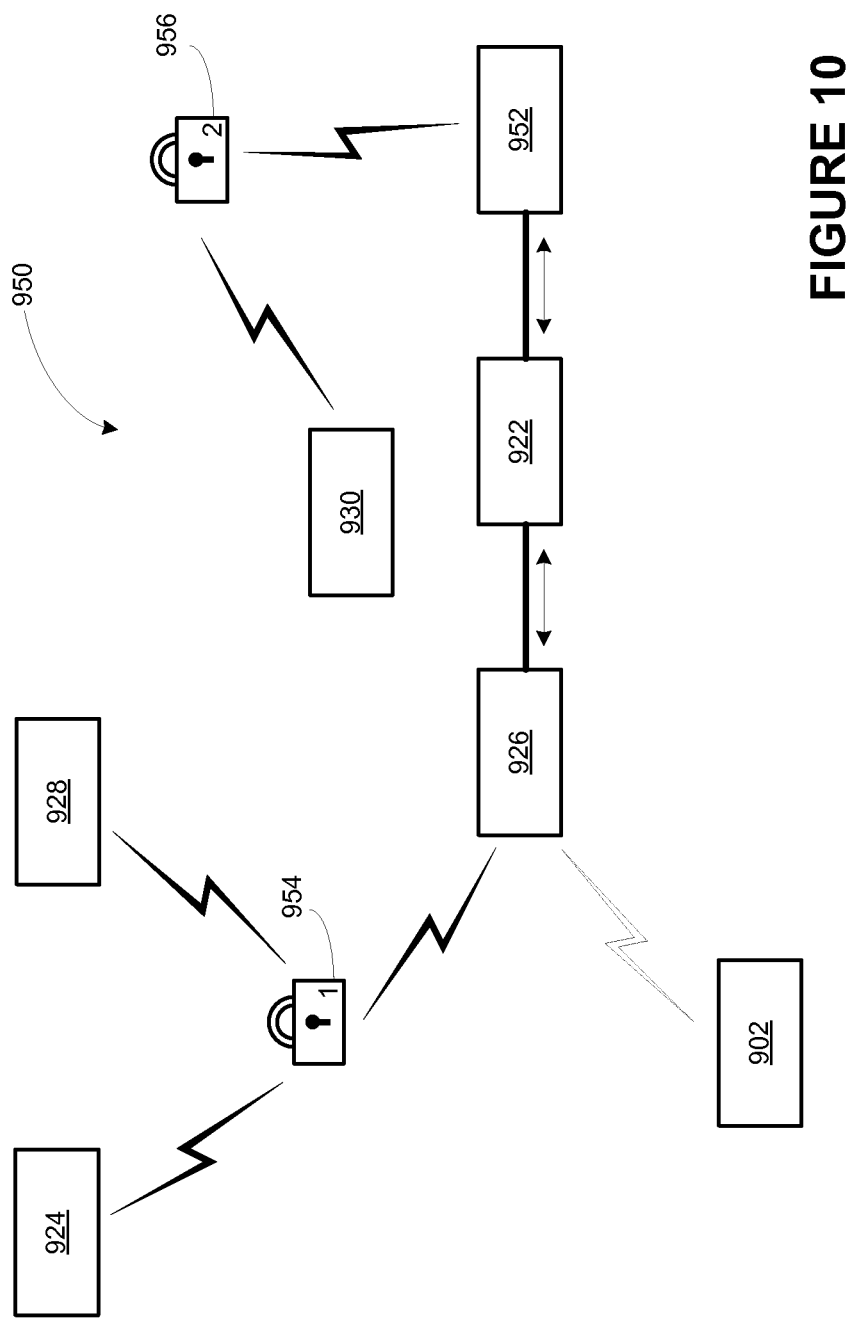
FIG. 10 shows an example interaction between devices when adding a playback device to, and configuring the playback device for a secure playback network of devices.

FIG. 10 further shows an example interaction 950 between devices when adding a playback device to, and/or configuring the playback device for a secure playback network of devices. FIG. 10 includes the new zone player 902, the controller 930, and zone players 922, 924, 926, and 928 similar to that shown in FIGS. 9A to 9C, and further includes an access point 952, a first secure network 954, and a second secure network 956. As shown, zone players 924, 928, and 926 may communicate wirelessly with each other over the first secure network 954. Zone players 926 and 922 may communicate over a wired connection, and zone player 922 may be coupled to the access point 952 to further be in communication with the controller 930 wirelessly over the second secure network 956. As shown in this example, a HOUSEHOLD may include more than one secure network.

When the new zone player 902 arrives at the household, as described in connection to FIGS. 9A, 9B, and 9C, the new zone player 902 may broadcast a join message indicating an availability to join the first secure network 954. In one example, the join message may be received by any one or more of the zone players shown in FIG. 10, including the controller 930. In the case the controller 930 receives the join message, the controller 930 may provide security parameters for joining the first secure network 954 to the new zone player 902 directly.

In another example, the new zone player 902 might not be within communicative range of the controller device 930, or the new zone player 902 is available to join the secure network 954, which the controller device 930, as shown, is not a part of. In either case, if the new zone player 902 is within communicative range of any of the other zone players in the HOUSEHOLD, such as zone player 926 as shown, the join message received by the zone player 926 may be forwarded to the controller 930 via zone player 922 and the access point 952 using the wired communication, and over the second secure network 956 wirelessly, Upon receiving the join message, the controller 930 may communicate to the new zone player 902 security parameters for joining the first secure network 954 via the second secure network 956, the access point 952, and zone players 926 and 922.

Subsequently, the new zone player may join the first secure network 954. One having ordinary skill in the art will appreciate that the join message may similarly be received by any of the other zone players and forwarded to the controller 930. As previously discussed, a similar chain of communication may also be implemented for configuring the new zone player 902 based on a configuration table received by the controller 930.

VIII. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As suggested above, the present application involves causing a new playback device to be automatically added to a secure network and configured to render media in synchrony with other devices in the secure network without any action by a user. In one aspect, a method is provided. The method involves receiving, by a controller device, a configuration table from a server over a wide area network, determining, by the controller device, that the configuration table includes an entry corresponding to the playback device that is unconfigured for playback, and responsively, transmitting from the controller device to the playback device, a first message comprising setup information for the playback device.

In another aspect, a controller device is provided. The controller device includes processor, memory, and instructions stored on the memory. The instructions are executable by the processor to perform functions including receiving a configuration table from a server over a wide area network, determining that the configuration table includes an entry corresponding to the playback device that is unconfigured for playback, and responsively, transmitting to the playback device, a first message comprising setup information for the playback device In yet another aspect, a non-transitory computer readable medium having instructions stored thereon is provided. The instructions are executable by a computing device to cause the computing device to perform functions including receiving, by a controller device, a configuration table from a server over a wide area network, determining, by the controller device, that the configuration table includes an entry corresponding to the playback device that is unconfigured for playback, and responsively transmitting, by the controller device to the playback device, a first message comprising setup information for the playback device.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

We claim:

1. A tangible, non-transitory computer-readable media having instructions encoded therein, wherein the instructions, when executed by one or more processors, cause a mobile computing device to perform a method comprising:
    receiving, via a network interface from a first playback device over an unsecure network, a message indicating that the first playback device is available to join a playback network, wherein one or more second playback devices are connected to the playback network;
    based on a pre-existing configuration table, determining an audio setting corresponding to a playback configuration for the first playback device, wherein the playback configuration comprises the first playback device playing back audio synchronously with at least one second playback device in the playback network, wherein the determined audio setting is stored in the pre-existing configuration table prior to the mobile computing device receiving the message indicating that the first playback device is available to join the playback network; and
    transmitting, via the network interface to the first playback device, a message instructing the first playback device to: (i) join the playback network using security parameters of the playback network, and (ii) apply the determined audio setting that is based on the pre-existing configuration table upon joining the playback network, wherein applying the determined audio setting comprises forming the playback configuration with the at least one second playback device to play back audio synchronously.

2. The non-transitory computer-readable media of claim 1, wherein the method further comprises receiving, from the first playback device, data identifying the first playback device, and wherein determining the audio setting corresponding to the first playback device comprises determining the audio setting further based on the data identifying the first playback device.

3. The non-transitory computer-readable media of claim 2, wherein the data identifying the first playback device comprises one or more of: (a) a serial number of the first playback device, and (b) a model name of the first playback device.

4. The non-transitory computer-readable media of claim 1, wherein determining the audio setting corresponding to the first playback device comprises:
    identifying, in the pre-existing configuration table, a zone group corresponding to the first playback device, wherein the zone group includes the at least one second playback device; and
    determining, as the audio setting corresponding to the first playback device, an audio setting corresponding to a given second playback device of the zone group.

5. The non-transitory computer-readable media of claim 1, wherein determining an audio setting corresponding to the first playback device comprises:
    identifying, in the pre-existing configuration table, a zone group corresponding to the first playback device; and
    determining, as the audio setting corresponding to the first playback device, an audio setting corresponding to the zone group.

6. The non-transitory computer-readable media of claim 1, wherein the method further comprises:
    receiving, from a server, the pre-existing configuration table.

7. The non-transitory computer-readable media of claim 1, wherein the method further comprises:
    in response to receiving the message indicating that the first playback device is available to join the playback network, transmitting, to a server, a request for the pre-existing configuration table; and before determining the audio setting, receiving, from the server, the pre-existing configuration table.

8. The non-transitory computer-readable media of claim 1, wherein the method further comprises:

after transmitting the message to the first playback device, transmitting to the first playback device, a command to cause the first playback device to play back audio content in synchrony with the at least one second playback device.

9. The non-transitory computer-readable media of claim 1, wherein receiving the message indicating that the first playback device is available to join the playback network comprises:

receiving, from the first playback device via a network access point, the message indicating that the first playback device is available to join the playback network.

10. A method comprising:

receiving, via a network interface of a mobile computing device from a first playback device over an unsecure network, a message indicating that the first playback device is available to join a playback network, wherein one or more second playback devices are connected to the playback network;

based on a pre-existing configuration table, determining an audio setting corresponding to a playback configuration for the first playback device, wherein the playback configuration comprises the first playback device playing back audio synchronously with at least one second playback device in the playback network, wherein the determined audio setting is stored in the pre-existing configuration table prior to the mobile computing device receiving the message indicating that the first playback device is available to join the playback network; and transmitting, via the network interface to the first playback device, a message instructing the first playback device to: (i) join the playback network using security parameters of the playback network, and (ii) apply the determined audio setting that is based on the pre-existing configuration table upon joining the playback network, wherein applying the determined audio setting comprises forming the playback configuration with the at least one second playback device to play back audio synchronously.

11. The method of claim 10, further comprising:

receiving, from the first playback device, data identifying the first playback device, and wherein determining the audio setting corresponding to the first playback device comprises determining the audio setting further based on the data identifying the first playback device.

12. The method of claim 11, wherein the data identifying the first playback device comprises one or more of: (a) a serial number of the first playback device, and (b) a model name of the first playback device.

13. The method of claim 10, wherein the first playback device is a first playback device, wherein the at least one second playback device comprises a second playback device, and wherein determining the audio setting corresponding to the first playback device comprises:

identifying, in the pre-existing configuration table, a zone group corresponding to the first playback device, wherein the zone group includes the at least one second playback device; and determining, as the audio setting corresponding to the first playback device, an audio setting corresponding to a given second playback device of the zone group.

14. The method of claim 10, wherein determining the audio setting corresponding to the first playback device comprises:

identifying, in the pre-existing configuration table, a zone group corresponding to the first playback device; and determining, as the audio setting corresponding to the first playback device, an audio setting corresponding to the zone group.

15. A mobile computing device comprising:

one or more processors; and tangible computer-readable media having instructions encoded therein, wherein the instructions, when executed by the one or more processors, cause the mobile computing device to perform a method comprising:

receiving, via a network interface from a first playback device over an unsecure network, a message indicating that the first playback device is available to join a playback network, wherein one or more second playback devices are connected to the playback network;

based on a pre-existing configuration table, determining an audio setting corresponding to a playback configuration for the first playback device, wherein the playback configuration comprises the first playback device playing back audio synchronously with at least one second playback device in the playback network, wherein the determined audio setting is stored in the pre-existing configuration table prior to the mobile computing device receiving the message indicating that the first playback device is available to join the playback network; and transmitting, via the network interface to the first playback device, a message instructing the first playback device to: (i) join the playback network using security parameters of the playback network, and (ii) apply the determined audio setting that is based on the pre-existing configuration table upon joining the playback network, wherein applying the determined audio setting comprises forming the playback configuration with the at least one second playback device to play back audio synchronously.

16. The mobile computing device of claim 15, the method further comprising:

in response to receiving the message indicating that the first playback device is available to join the playback network, transmitting, to a server, a request for the pre-existing configuration table; and before determining the audio setting, receiving, from the server, the pre-existing configuration table.

17. The mobile computing device of claim 15, the method further comprising:

after transmitting the message to the first playback device, transmitting to the first playback device, a command to cause the first playback device to play back audio content in synchrony with the at least one second playback device.

18. The mobile computing device of claim 15, wherein receiving the message indicating that the first playback device is available to join the playback network comprises:

receiving, from the first playback device via a network access point, the message indicating that the first playback device is available to join the playback network.

19. The non-transitory computer-readable media of claim 1, wherein the determined audio setting comprises at least one of: i) an audio setting for a zone group comprising the first playback device and the at least one second playback device, ii) an audio setting for a bonded zone comprising the first playback device and the at least one second playback device, and iii) an equalization setting for the first playback device.

20. The mobile computing device of claim 15, wherein the determined audio setting comprises at least one of: i) an audio setting for a zone group comprising the first playback device and the at least one second playback device, ii) an audio setting for a bonded zone comprising the first playback device and the at least one second playback device, and iii) an equalization setting for the first playback device.

21. The method of claim 10, wherein the determined audio setting comprises at least one of: i) an audio setting for a zone group comprising the first playback device and the at least one second playback device, ii) an audio setting for a bonded zone comprising the first playback device and the at least one second playback device, and iii) an equalization setting for the first playback device.

* * * * *